United States Patent
Kokubu et al.

[11] Patent Number: 6,075,453
[45] Date of Patent: *Jun. 13, 2000

[54] VEHICULAR DOOR LOCK CONTROL APPARATUS

[75] Inventors: Sadao Kokubu; Hisashi Aoki; Takashi Mizuno; Shinichi Koga, all of Niwa, Japan

[73] Assignee: Kabushiki Kaisha Tokai-Rika-Denki-Seisakusho, Ohguchi-cho, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/823,210

[22] Filed: Mar. 24, 1997

[30] Foreign Application Priority Data

Mar. 29, 1996 [JP] Japan .................................... 8-075783

[51] Int. Cl.⁷ ...................................................... G06F 7/04
[52] U.S. Cl. ............................. 340/825.31; 340/825.72; 340/426; 340/10.1; 380/23; 380/46; 70/277; 70/278; 292/359
[58] Field of Search ......................... 340/825.31, 825.72, 340/825.54, 426, 10.1; 380/23, 46; 292/359; 70/277, 278

[56] References Cited

U.S. PATENT DOCUMENTS

| | | | |
|---|---|---|---|
| 4,509,093 | 4/1985 | Stellberger | 340/825.31 |
| 4,849,749 | 7/1989 | Fukamachi et al. | 340/825.31 |
| 5,140,317 | 8/1992 | Hyatt, Jr. et al. | 340/825.31 |
| 5,540,069 | 7/1996 | Muller et al. | 70/278 |
| 5,541,581 | 7/1996 | Trent | 340/825.31 |
| 5,552,777 | 9/1996 | Gokcebay et al. | 340/825.31 |
| 5,625,349 | 4/1997 | Disbrow et al. | 340/825.31 |
| 5,635,900 | 6/1997 | Hasegawa et al. | 340/825.72 |
| 5,712,626 | 1/1998 | Andreou et al. | 340/825.72 |
| 5,745,044 | 4/1998 | Hyatt, Jr. et al. | 340/825.31 |

FOREIGN PATENT DOCUMENTS 63-30556 U  2/1988  Japan .

*Primary Examiner*—Brian Zimmerman
*Assistant Examiner*—Yves Dalencourt
*Attorney, Agent, or Firm*—Oliff & Berridge, PLC

[57] ABSTRACT

A vehicular door lock control apparatus for unlocking a door lock mechanism includes a key for performing a first unlocking operation and a second unlocking operation. A door key cylinder is actuable to an unlock position by using the key. The key is insertable into the door key cylinder. A transmitter-receiver is disposed at the key, and transmits an answer signal that indicates a specific identification code upon receipt of at least one of a power signal and an inquiry signal. An operating force transmission mechanism, actuable between a transmission mode and a non-transmission mode, transmits an unlocking force applied by the key during the second unlocking operation to the door lock mechanism when in the transmission mode. A control mechanism transmits at least one of the power signal and the inquiry signal to the transmitter-receiver when the key performs the first unlocking operation, and actuates the operating force transmission mechanism to the transmission mode when the identification code received from the transmitter-receiver conforms to a pre-set identification code.

11 Claims, 11 Drawing Sheets

VEHICULAR DOOR LOCK CONTROL APPARATUS

INCORPORATION BY REFERENCE

The entire disclosure of Japanese Patent Application No. Hei 8-75783 filed on Mar. 29, 1996 including the specification, drawings and abstract is incorporated herein by reference in its entirety.

BACKGROUND OF THE INVENTION

1. Field of the Invention

The invention relates to a vehicular door lock control apparatus that unlocks a door lock mechanism by using a key having a transmitter on a door key cylinder.

2. Description of the Related Art

A conventional door key cylinder which is disposed in a door of a vehicle is directly connected to a door lock device. Thus, an operating force applied to the door key cylinder is directly transmitted to the door lock device. Therefore, the conventional vehicular door lock system has the disadvantage of being susceptible to improper unlocking operations performed on the door key cylinder. For example, the door lock device can be improperly unlocked by using a mechanically duplicated key or a lockpick on the door key cylinder. The door lock mechanism can also be improperly unlocked by breaking the key cylinder using a screw driver or similar apparatus.

SUMMARY OF THE INVENTION

Accordingly, it is an object of the present invention to provide a vehicular door lock control apparatus that safeguards a door lock cylinder from being used to improperly unlock a door lock mechanism.

A vehicular door lock control apparatus in accordance with the invention unlocks a door lock mechanism pursuant to an unlocking operation performed with a key. The control apparatus includes a key that is provided with a transmitter-receiver. The key is insertible into a door key cylinder to actuate the door key cylinder to an unlock position. Upon receiving a power signal or an inquiry signal, the transmitter-receiver of the key transmits an answer signal that indicates a specific identification code. An operating force transmission device selectively transmits an unlocking force applied by the key inserted in the door key cylinder to the door lock mechanism. A control device transmits the power signal or the inquiry signal to the transmitter-receiver of the key if the key performs a predetermined operation. If the identification code received from the transmitter-receiver of the key conforms to a pre-set identification code, the control device switches the operating force transmission device to a transmission mode.

In order to unlock the door lock mechanism of the vehicular door lock control apparatus and enter the vehicle, a person must perform a predetermined operation using the key. Then, the control device transmits the power signal (or inquiry signal) to the key. Upon receiving the power signal (or inquiry signal), the transmitter-receiver of the key transmits the answer signal indicating a specific identification code. The control device then receives the predetermined identification code from the key, and switches the operating force transmission device to the transmission mode.

Subsequently, when the person uses the key to actuate the door cylinder to the unlock position, the operating force transmission device transmits the unlocking force, applied to the door cylinder by the key, to the door lock mechanism, thus unlocking the door lock mechanism.

In accordance with the invention, the control device may determine that the predetermined operation has been performed when the key actuates the door key cylinder to the unlock position for the first time. With this construction, when a person uses the key to actuate the door lock cylinder to the unlock position, the control device determines that the predetermined operation has been performed and transmits the inquiry signal (or power signal) to the transmitter-receiver. After receiving the answer signal from the transmitter-receiver indicating the identification code, the control signal switches the operating force transmission device to the transmission mode. When the key again actuates the key cylinder to the unlock position, the unlocking force is transmitted to the door lock mechanism by the operating force transmission device, thus unlocking the door lock mechanism.

Furthermore, the control device may determine that the predetermined operation has been performed when the key is inserted into the door key cylinder. With this construction, when a person inserts the key into the door key cylinder, the control device determines that the predetermined operation has been performed and transmits the inquiry signal (or power signal) to the transmitter-receiver. After receiving the answer signal from the transmitter-receiver indicating the identification code, the control signal switches the operating force transmission device to the transmission mode. When the key actuates the door key cylinder to the unlock position, the unlocking force is transmitted to the door lock mechanism by the operating force transmission device, thus unlocking the door lock mechanism.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

A preferred embodiment of the invention will be described in detail hereinafter with reference to the accompanying drawings.

Figure 1:
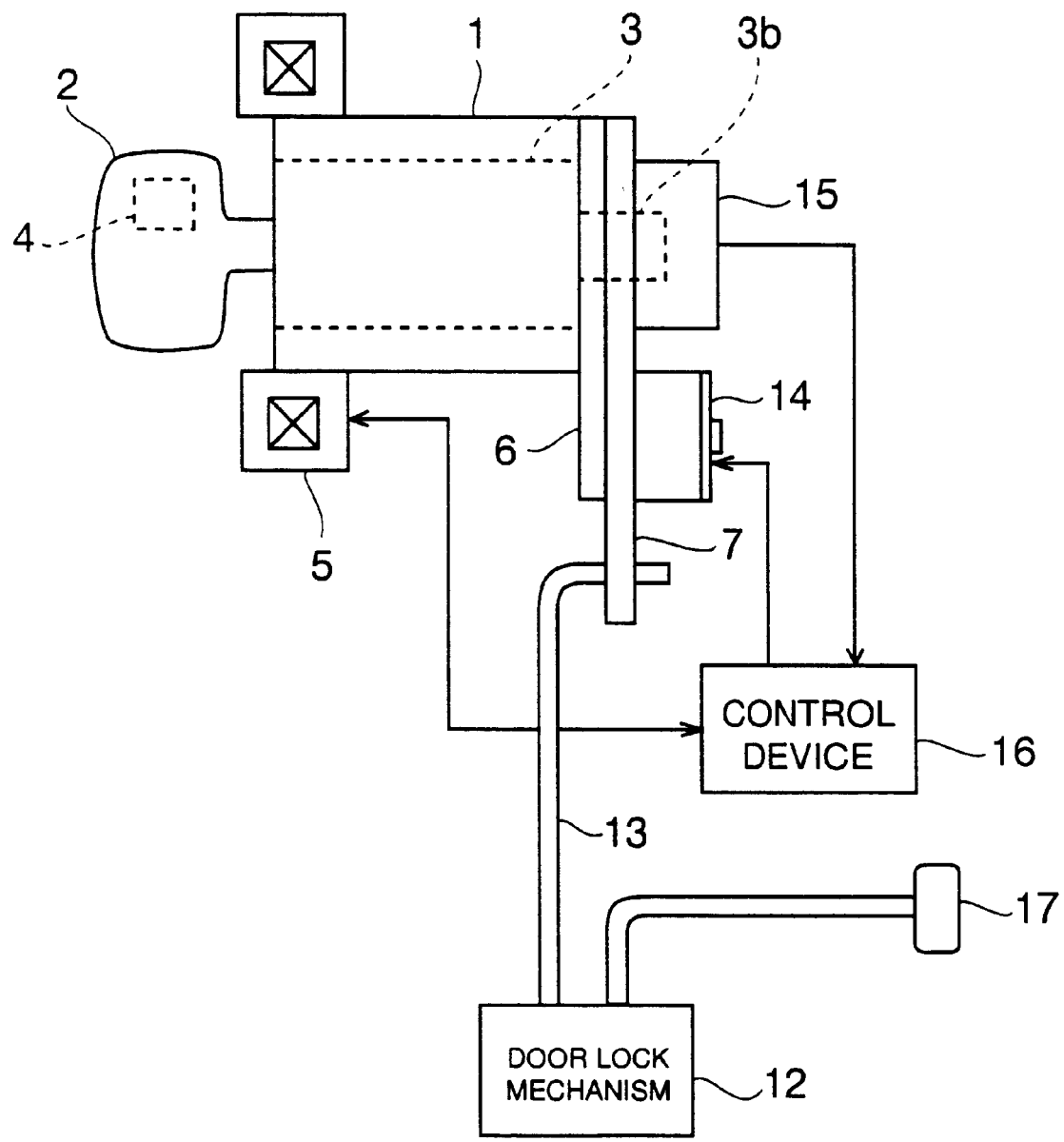
FIG. 1 is a schematic showing the entire construction of a vehicular door lock control apparatus in accordance with an embodiment of the present invention.
Figure 2:
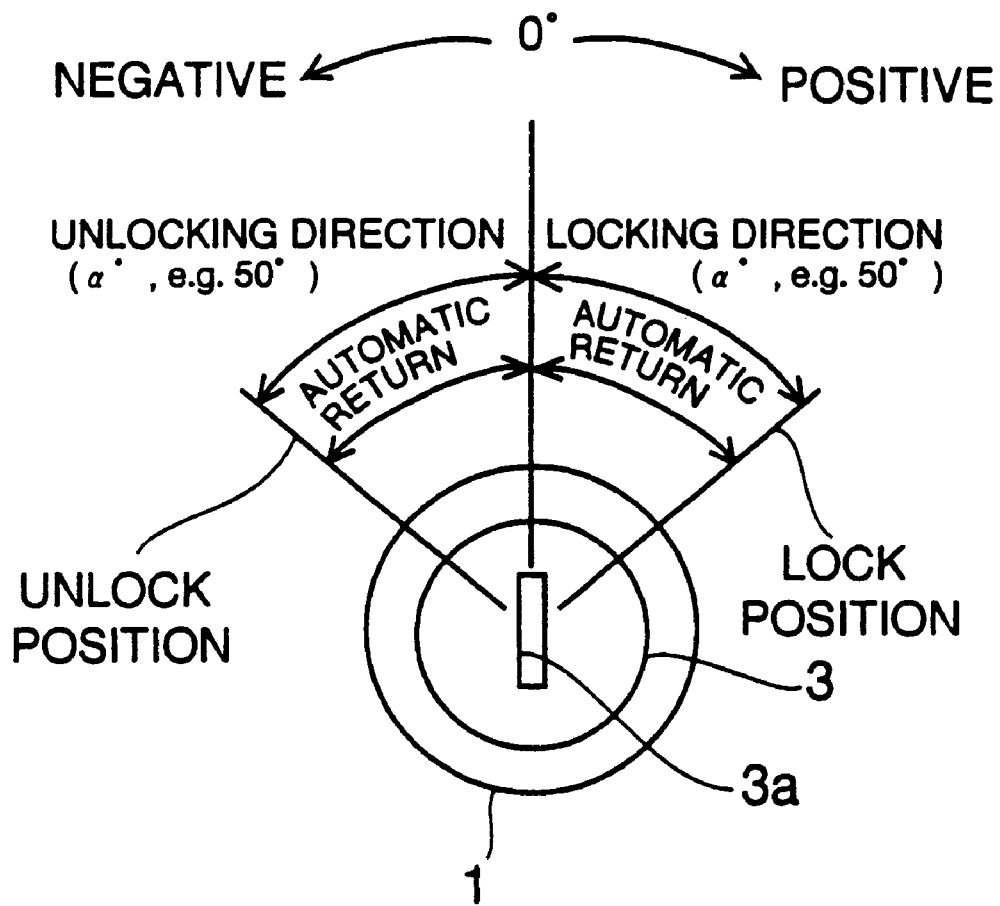
FIG. 2 is a front elevational view of a door key cylinder shown in FIG. 1.

FIG. 1 is a schematic showing the entire construction of a vehicular door lock control apparatus in accordance with an embodiment of the invention. A door key cylinder 1 is fixed to a door (not shown), and has a rotatable rotor 3. As shown in FIG. 2, the rotatable rotor 3 has an insert slot 3a. An electronic key 2 is insertable into the insert slot 3a, as shown in FIG. 1.

In the door key cylinder 1 shown in FIG. 2, rotation of the rotor 3 in the clockwise direction (positive direction) from a neutral position is set as a locking direction. Rotation of the rotor 3 in the counterclockwise direction (negative direction) is set as an unlocking direction. The rotor 3 automatically returns to, and remains in, the neutral position during idle time. A lock position and an unlock position are set at an appropriate rotational angle, for example, 50°, in the respective locking and unlocking directions from the neutral position.

As shown in FIG. 1, the electronic key 1 includes a transceiver 4 which operates as a trarsmitter-receiver. The transceiver 4 is activated upon receiving an electrical power signal from an external device. Subsequently, when the transceiver 4 receives a power signal or an inquiry signal mixed with a power signal, the transceiver 4 transmits its specific pre-stored identification code. The transceiver 4 transmits its identification code by mixing an answer signal indicating the identification code with the power signal.

As shown in FIG. 1, a front end portion of the door key cylinder 1 is surrounded by an antenna coil 5. The antenna coil 5 transmits the power signal to the transceiver 4. The antenna coil 5 also receives signals transmitted from the transceiver 4 in accordance with changes in the impedance of the power signal.

Figure 3:
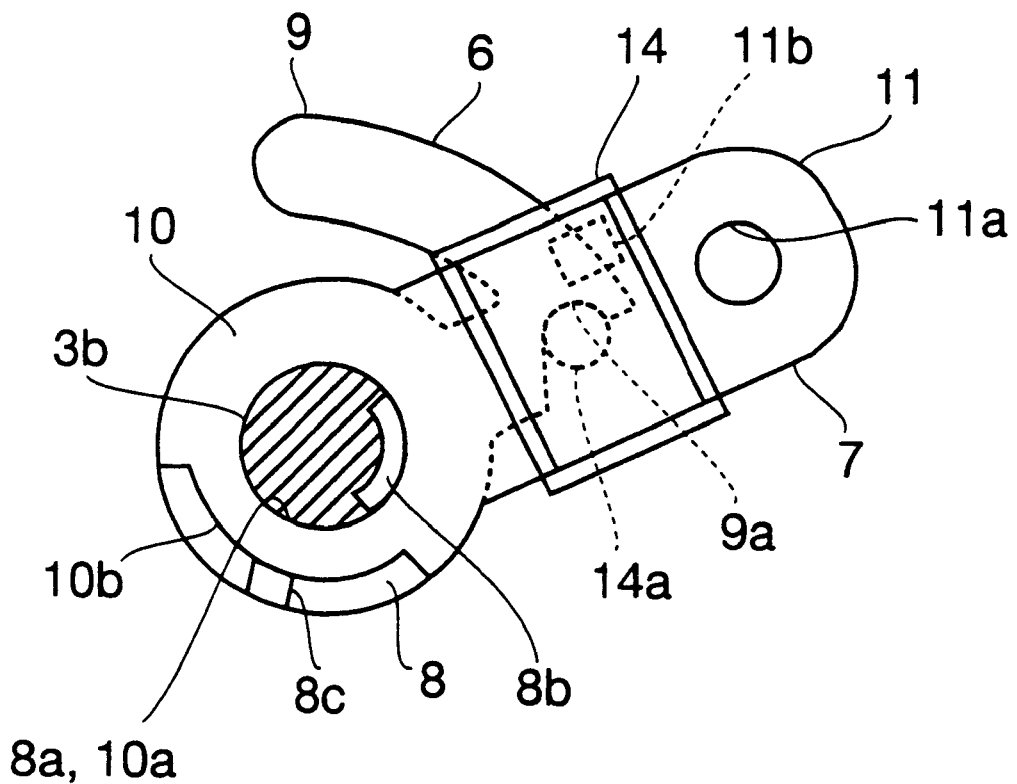
FIG. 3 is a rear elevational view of the door key cylinder shown in FIG. 2.
Figure 4:
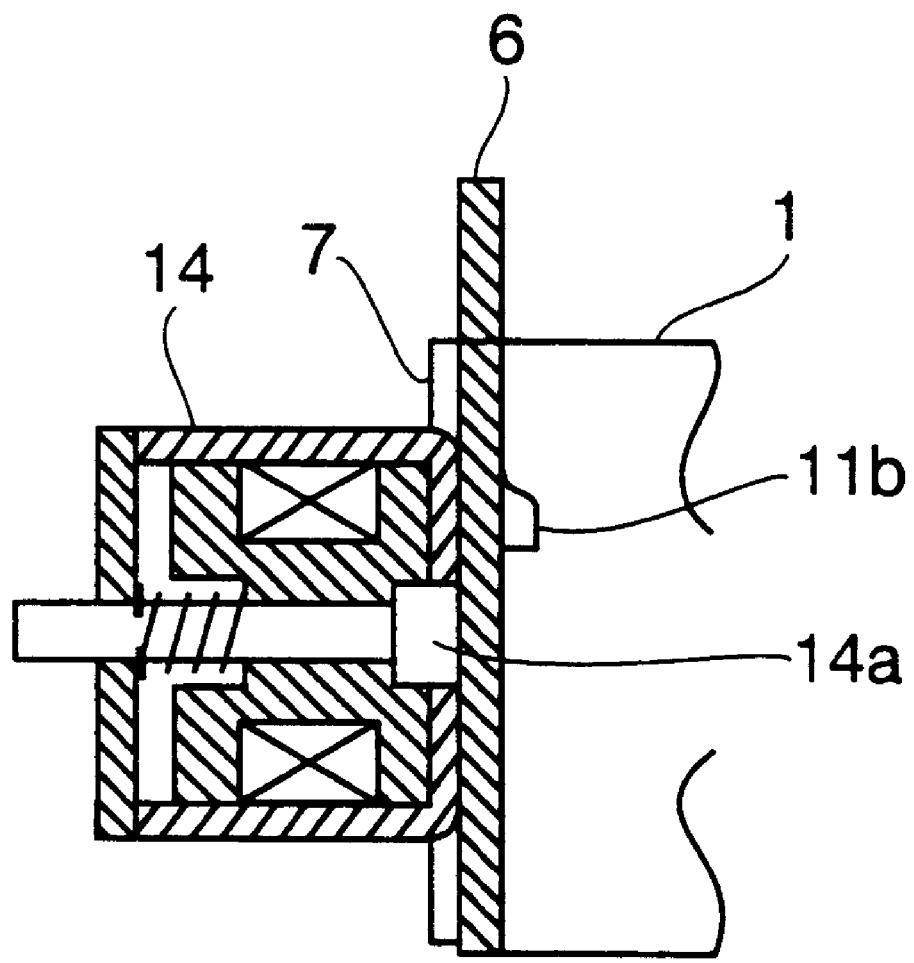
FIG. 4 is a longitudinal sectional view of a portion of a clutch plate and a portion of a lever shown in FIG. 1.

A protrusion 3b of the rotor 3 protrudes from a rear face of the door key cylinder 1. The protrusion portion 3b supports a clutch plate 6 and a lever 7, as shown in FIGS. 3 and 4.

Figure 5:
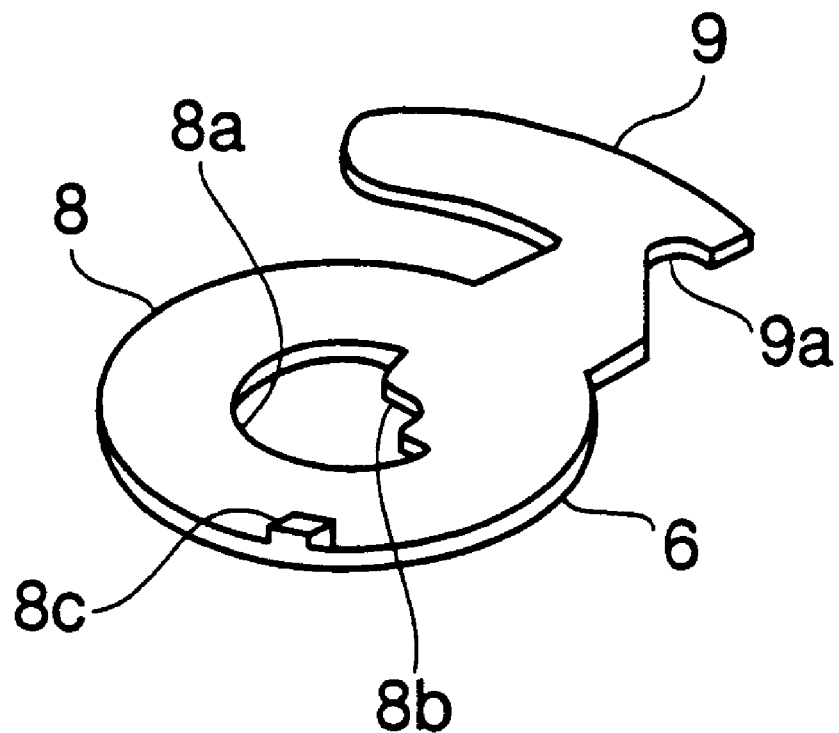
FIG. 5 is a perspective view of the clutch plate shown in FIG. 4.

As shown in FIG. 5, the clutch plate 6 has a flat plate-like shape. The clutch plate 6 includes a disc portion 8 and a J-shaped arm portion 9 that are unitarily formed together.

The disc portion 8 has a hole 8a and a protrusion 8b that is formed on an inner peripheral edge defining the hole 8a. The clutch plate 6 is connected to the rotor 3 such that the clutch plate 6 is prevented from rotating. Specifically, clutch plate 6 is prevented from rotating because the protrusion 8b of the clutch plate 6 is fitted into a key groove of the protrusion 3b of the rotor 3. The disc portion 8 of the clutch plate 6 has a cut-and-raised piece 8c at a specified position. A bent portion of the arm portion 9 extending from the disc portion 8 has a semi-circular cutout 9a.

The angle between the bent portion and a distal end of the arm portion 9 corresponds to the rotational angle of the rotor 3 of the door key cylinder 1, between the neutral position and the unlock position.

Figure 6:
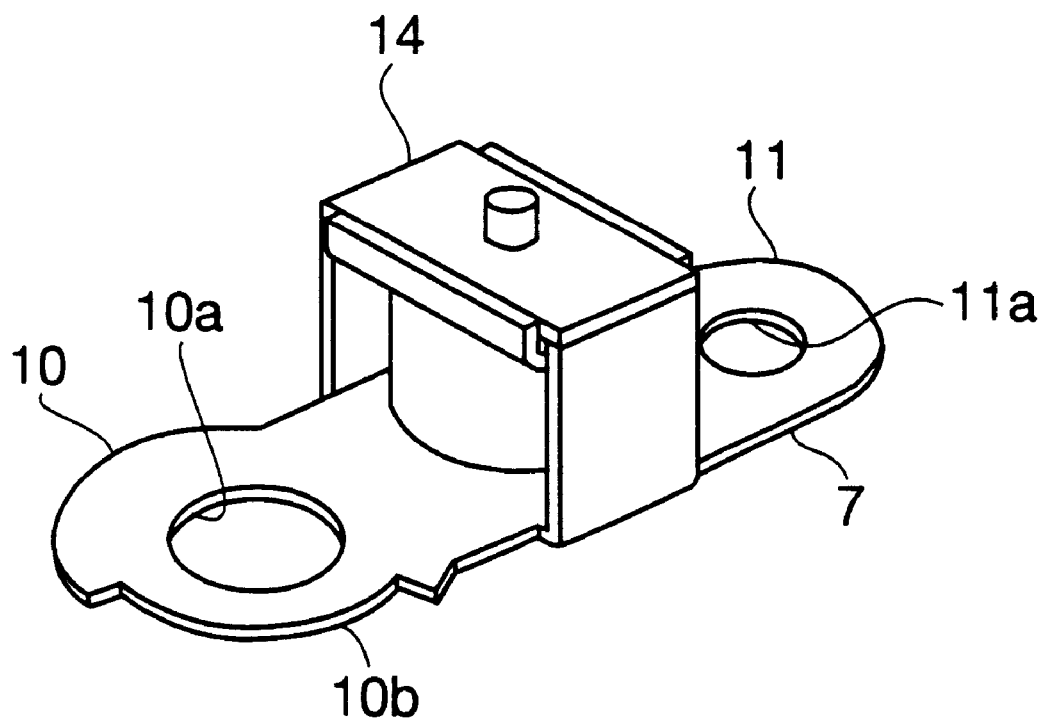
FIG. 6 is a perspective view of the lever shown in FIG. 4.

As shown in FIG. 6, the lever 7 is shaped as a flat plate. The lever 7 includes a disc portion 10 and an arm portion 11 that are unitarily formed together.

The disc portion 10 of the lever 7 defines a hole 10a. The protrusion 3b of the rotor 3 extends through the hole 10a, thereby connecting the lever 7 to the rotor 3 in a rotatable manner. The disc portion 10 has a cutout 10b that extends along a peripheral edge over a specified angle. When both the lever 7 and the clutch plate 6 are connected to the rotor 3, the cut-and-raised piece 8c of the clutch plate 6 is disposed in the cutout 10b of the lever 7, as shown in FIG. 3.

A distal end portion of the arm portion 11 defines a hole 11a. An end of a link 13 connected to a door lock mechanism 12 is rotatably supported in the hole 11a, as shown in FIG. 1. Thus, the door lock mechanism 12 is switched between locked and unlocked positions based upon the movement of the link 13, which is caused by the rotation of the lever 7.

Figure 7:
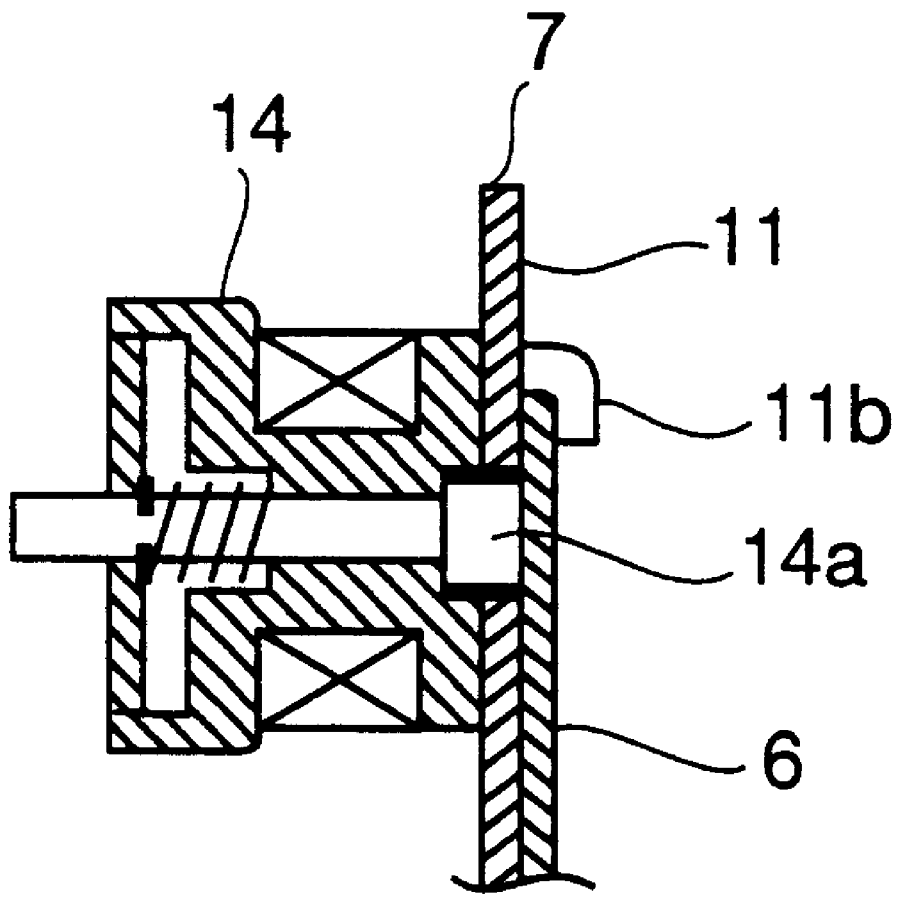
FIG. 7 is another longitudinal view of a portion of the clutch plate and a portion of the lever shown in FIG. 1.

A solenoid 14 is disposed on a side of the lever 7 opposite the clutch plate 6, as shown in FIG. 7. When energized, the solenoid 14 thrusts a plunger 14a in a direction toward the clutch plate 6. The solenoid 14 is disposed such that the plunger 14a directly faces the locus of the movement of the cutout 9a caused by the rotation of the clutch plate 6.

The arm portion 11 of the lever 7 has a cut-and-raised piece 11b which projects from a side of the lever attached to the clutch plate 6. The cut-and-raised piece 11b receives and stops a peripheral portion of the clutch plate 6. Therefore, if the plunger 14a of the solenoid 14 strikes the clutch plate 6, the force applied thereto is resisted by the cut-and-raised piece 11b of the lever 7.

In accordance with this embodiment of the invention, the clutch plate 6, the lever 7 and the solenoid 14 form an operating force transmission device.

As shown in FIG. 1, a rotational position detecting sensor 15 is provided for detecting the rotational position of the rotor 3 of the door key cylinder 1. The sensor 15 detects the position of the rotor 3, i.e., the neutral position, the lock position or the unlock position, and outputs a corresponding signal to a control device 16, thereby communicating the position of the rotor 3.

Upon receiving a signal indicating the unlock position from the rotational position detecting sensor 15, the control device 16 outputs a power signal to the antenna coil 5. The control device 16 receives an answer signal based on a change in the impedance of the power signal during transmission of the power signal. If an identification code indicated by the answer signal conforms to a pre-set identification code, the control device 16 energizes the solenoid 14 for a predetermined time.

The door lock mechanism 12 can also be switched between the locked state and the unlocked state as desired by operating a manual knob 17 disposed in the door.

Figure 8:
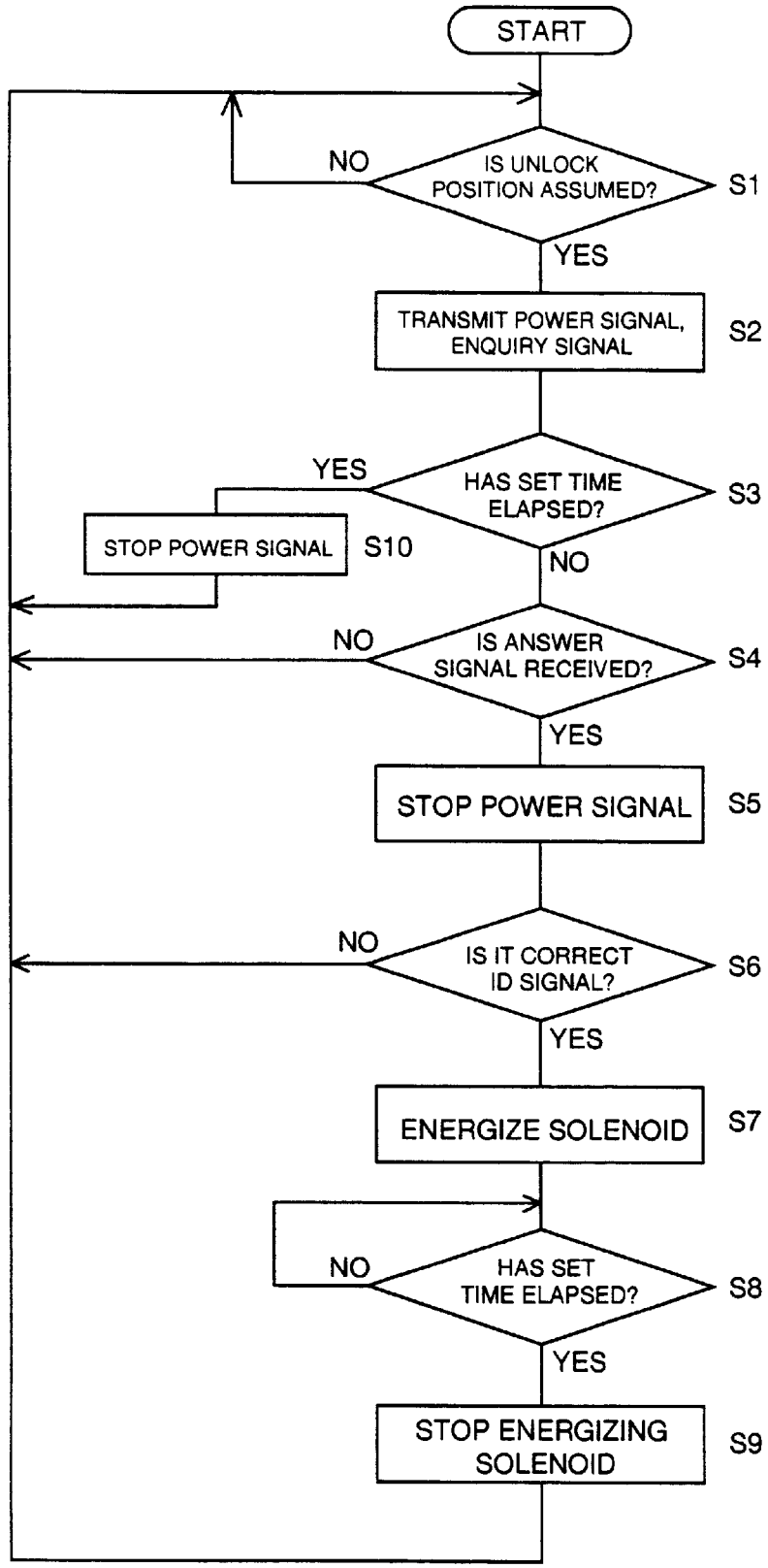
FIG. 8 is a flowchart showing the operation of the control device.

FIG. 8 is a flowchart showing the operation of the control device 16. The operation of this embodiment of the invention is described with reference to FIG. 8.

To enter a vehicle, a person inserts a blade of the electronic key 2 into the rotor 3 of the door key cylinder 1 and rotates the key 2 counterclockwise. The clutch plate 6 rotates along with the rotor 3. The solenoid 14 which is disposed on the lever 7 is not energized and, therefore, the plunger 14a is withdrawn. Thus, the lever 7 does not rotate along with the clutch plate 6.

When the electronic key 2 is turned to the unlock position, the rotational position detecting sensor 15 communicates to the control device 16 that the door key cylinder 1 is in the unlock position. Upon being notified that the door key cylinder is in the unlock position (step S1), the control device 1 outputs a power signal to the antenna coil 5 and mixes an inquiry signal with the power signal (step S2). Thus, the power signal and the inquiry signal are transmitted from the antenna coil 5.

The transceiver 4 in the electronic key 2 is activated upon receiving the power signal. When the transceiver 4 is active and receives the inquiry signal, the transceiver 4 mixes an answer signal with the power signal to indicate its pre-stored specific identification code.

The power signal and the mixed answer signal (identification code) from the transceiver 4 changes the impedance of the antenna coil 5. The control device 16 stops transmitting the power signal (step S5) if the control device 16 receives the answer signal, based upon a change in the impedance of the antenna coil 5, within a predetermined time following the transmission of the power signal and the inquiry signal mixed therewith (steps S3 and S4). The control device 16 then determines whether the identification code indicated by the answer signal conforms to the pre-set identification code (step S6).

If the key inserted in the door key cylinder 1 is an improperly duplicated key, a transceiver 4 does not transmit the identification code in response to the power signal from the antenna coil 5. The control device 16 determines that a false unlocking operation is being performed if no answer signal is received within a predetermined time following the reception of the unlock position signal from the rotational position detecting sensor 15 (step S3). The control device 16 then stops transmitting the power signal and returns to the initial state (step S10).

The clutch plate 6 and the lever 7 remain disengaged from each other in such a situation. Thus, the door lock mechanism 12 is not unlocked despite the operation performed on the door key cylinder 1.

The control device 16 determines that the electronic key 2 being used is an authentic key if the identification code from the transceiver 4 conforms to the pre-set identification code. The control device 16 energizes the solenoid 14 (step S7), thereby thrusting the plunger 14a in a direction toward the clutch plate 6.

Figure 9:
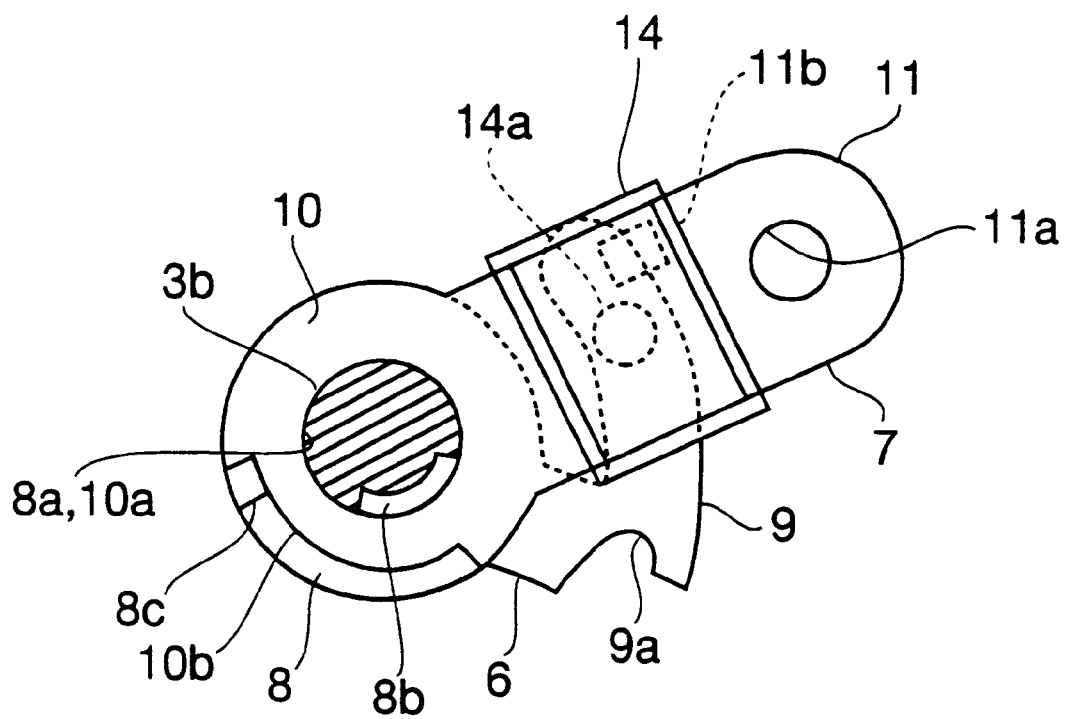
FIG. 9 is a rear elevational view of the door key cylinder shown in FIG. 2, wherein the clutch plate is actuated to an unlock position while it is disengaged from the lever.

The distal end portion of the arm portion 9 of the clutch plate 6 faces the plunger 14a of the solenoid 14 in this situation, as shown in FIG. 9. As a result, the plunger 14a thus projected merely abuts against the arm portion 9 of the clutch plate 6, so that the clutch plate 6 remains disengaged from the lever 7.

When the rotor 3 is returned to the neutral position by the electronic key 2 as shown in FIG. 3, the distal end of the plunger 14a of the solenoid 14 slides along the clutch plate 6 to fit into the cutout 9a. As a result, the clutch plate 6 engages the lever 7 with respect to the unlocking direction of the rotor 3.

Figure 10:
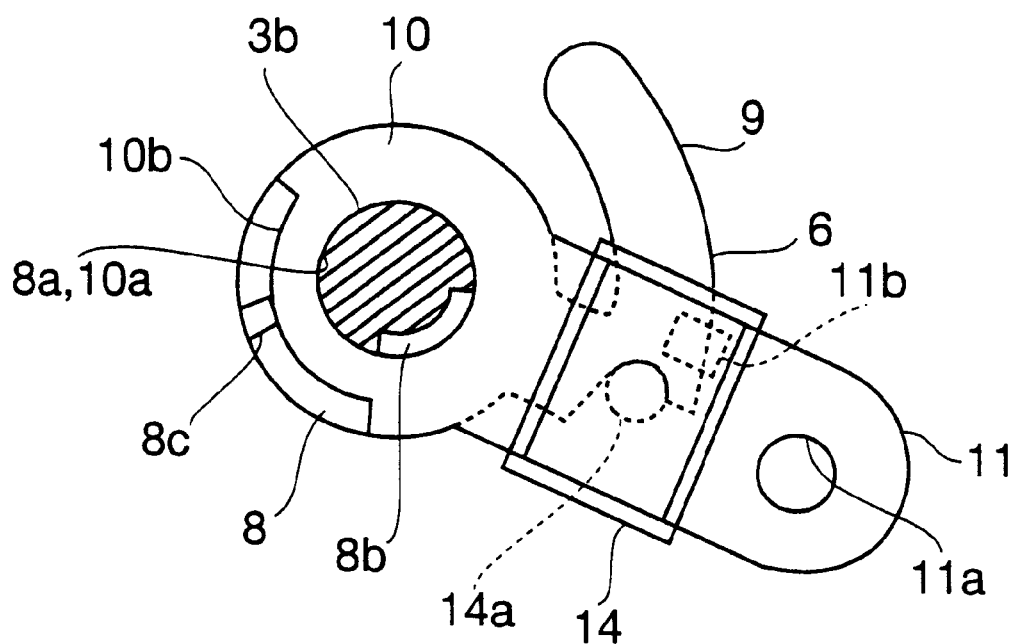
FIG. 10 is a rear elevational view of the door key cylinder shown in FIG. 2, wherein the clutch plate is actuated to the unlock position while it is engaged with the lever.
Figure 11:
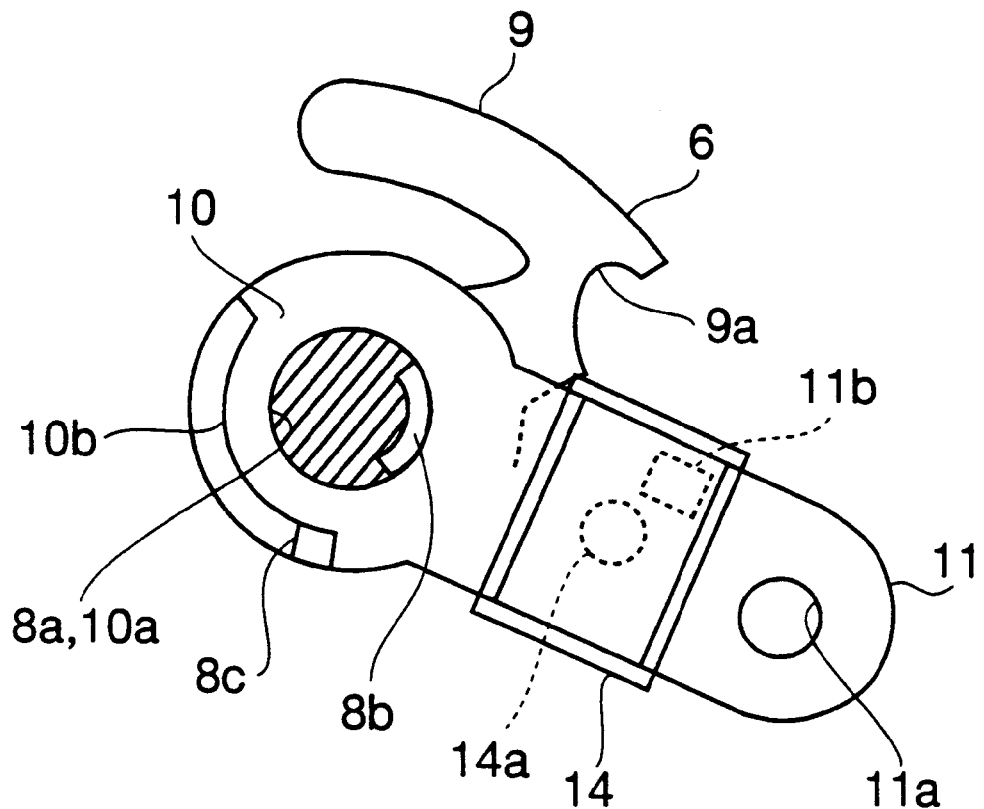
FIG. 11 is a rear elevational view of the door key cylinder shown in FIG. 2, wherein the clutch plate is returned to a neutral position while it is disengaged from the lever.

When the electronic key 2 is turned to the unlock position and the clutch plate 6 engages the lever 7 in this manner, the lever 7 rotates along with the clutch plate 6, to take a position at the unlock side as shown in FIG. 10.

The link 13 moves in accordance with the rotation of the lever 7. The movement of the link 13 causes the door lock mechanism 12 to switch to the unlocked state, allowing a person to open the door and enter the vehicle.

In summary of the operation of the invention, the control device 16 prevents the door lock mechanism 12 from switching to the unlocked state when the electronic key 2 performs a first unlocking operation. During the first unlocking operation of the key, the control device 16 determines whether the electronic key 2 used is an authentic key. The control device 16 operates to make a second key unlocking operation effective only after determining that the electronic key 2 used is an authentic key, thus finally allowing the door lock mechanism 12 to be unlocked.

The cut-and-raised piece 8c of the clutch plate 6 is positioned at an end of the cutout 10b of the lever 7 when the electronic key 2 is moved back to the neutral position and the lever 7 is disposed at the unlock side due to the above-described movement of the clutch plate 6.

To lock the door after exiting the vehicle, the person inserts the electronic key 2 into the rotor 3 of the door key cylinder 1 and turns the electronic key 2 to the lock position. As the electronic key 2 turns, the cut-and-raised piece 8c of the clutch plate 6 abuts against the end of the cutout 10b of the lever 7. This abutment forces the lever 7 to turn to the lock side as shown in FIG. 3, switching the door lock mechanism 12 to the locked state. The door of the vehicle is thus locked.

Unlike the door unlocking operation, the door locking operation is simple. Specifically, the door lock mechanism 12 is locked by performing the key locking operation once, and the control device 16 does not check the authenticity of the electronic key 2. The door locking operation is simple because it is not necessary to safeguard against the use of a false key to lock a door. Also, if the door locking operation requires that the key locking operation be performed twice, a user may mistakenly believe that the door is locked after performing the key locking operation once, which diminishes security.

As understood from the above description, during the first unlocking operation performed by the key on the door key cylinder 1, the control device 16 determines whether the key is authentic. If it is determined that an authentic electronic key is being used, the control device 16 makes the second key unlocking operation effective by connecting the door key cylinder 1 to the door lock mechanism 12. Therefore, compared with conventional locks wherein the rotor lever is always connected to the door lock mechanism, the invention has a highly reliable construction which perverts the door lock mechanism from being unlocked by an improperly duplicated key or similar device, thus improving security.

The embodiment may be modified, for example, as described below.

The transceiver 4 provided in the electronic key 2 may also have an immobilizing function, i.e., to prevent or permit the starting of the engine depending on the conformity of the identification code of the electronic key with the pre-set identification code of the vehicle.

The door key cylinder 1 may be provided with a key remind switch. Upon actuation of the key remind switch in response to insertion of the electronic key into the door key cylinder, the control device 16 outputs the power signal and the inquiry signal to the antenna coil 5.

The electronic key 2 may contain a cell-powered transceiver, instead of the transceiver 4 powered by the power signal.

While the present invention has been described with reference to what is presently considered to be a preferred embodiment thereof, it is understood that the invention is not limited to the disclosed embodiment or construction. To the contrary, the invention is intended to cover various modifications and equivalent arrangements included within the spirit and scope of the appended claims.

What is claimed is:

1. A vehicular door lock control apparatus for unlocking a door mechanism, comprising:

a key for mechanically performing a first unlocking operation and a second unlocking operation;

a door key cylinder actuable to an unlock position by using the key, the key being insertable into the door key cylinder;

a transmitter-receiver disposed at the key, for transmitting an answer signal that indicates a specific identification code upon receipt of at least one of a power signal and an inquiry signal;

operating force transmission means, actuable between a transmission mode and a non-transmission mode, for transmitting a mechanical unlocking force applied by the key during the second unlocking operation to the door lock mechanism when in the transmission mode, and a control means for determining that the key has performed the first unlocking operation when the key actuates the door key cylinder to the unlock position for a first time;

wherein the control means transmits at least one of the power signal and the inquiry signal to the transmitter-receiver when the key performs the first unlocking operation, and for actuating the operating force transmission means to the transmission mode when the identification code received from the transmitter-receiver conforms to a pre-set identification code.

2. A vehicular door lock control apparatus according to claim 1, wherein the control means immobilizes a vehicle if the identification code received from the transmitter-receiver does not conform to the pre-set identification code.

3. A vehicular door lock control apparatus according to claim 1, wherein the transmitter-receiver includes a power source.

4. A vehicular door lock control apparatus according to claim 1, wherein the operating force output means includes a clutch plate, a lever and a solenoid.

5. A vehicular door lock control apparatus according to claim 4, wherein the solenoid is disposed at a first side of the lever and the clutch plate is disposed at an opposite second side of the lever.

6. A vehicular door lock control apparatus according to claim 5, wherein the lever has a projecting cut-and-raised portion which receives and stops a peripheral portion of the clutch plate.

7. A vehicular door lock control apparatus according to claim 6, wherein the door key cylinder includes a rotatable rotor.

8. A vehicular door lock control apparatus according to claim 7, wherein the transmitter-receiver includes an antenna coil disposed around the door key cylinder.

9. A vehicular door lock control apparatus according to claim 8, wherein the rotor includes a protrusion which supports the clutch plate and the lever.

10. A vehicular door lock control apparatus according to claim 9, further including a rotational position detecting sensor for detecting a rotational position of the rotor and transmitting the rotational position of the rotor to control means.

11. A vehicular door lock control apparatus according to claim 10, further including a manual knob which locks and unlocks the door lock mechanism.

* * * * *